Dec. 18, 1951  E. P. CODLING  2,579,066
MOTOR CONTROL
Filed Jan. 18, 1950
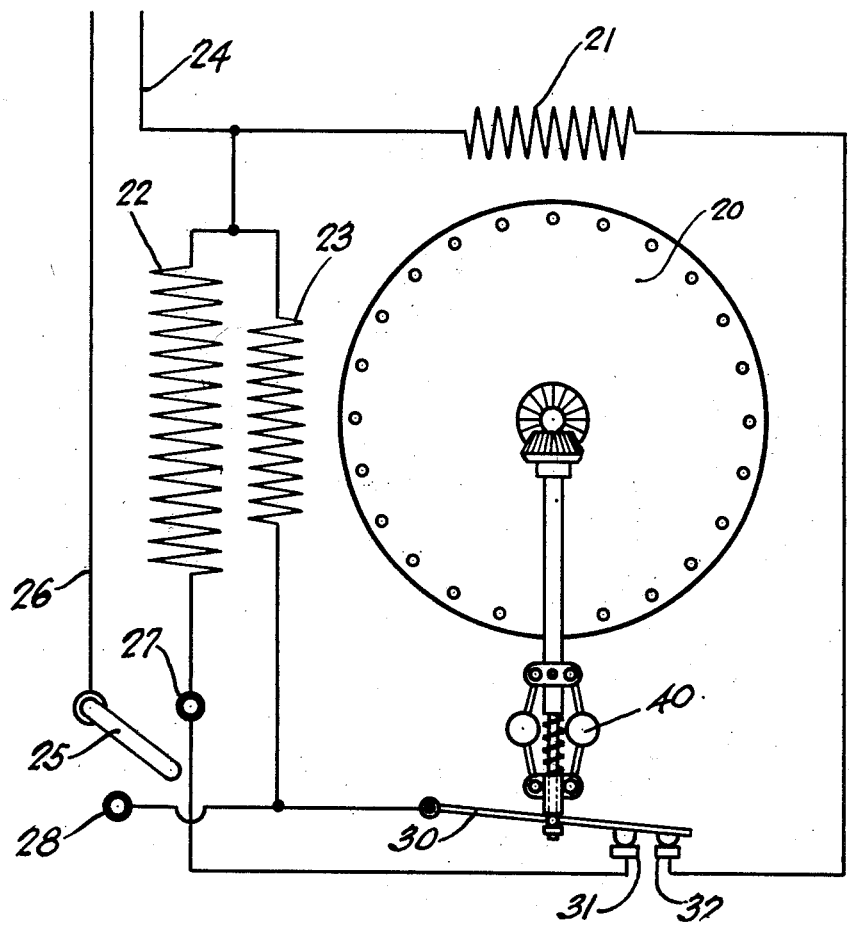
INVENTOR
ELDRED P. CODLING.
BY *Willis, Hardman and Fehr*
ATTORNEYS Patented Dec. 18, 1951

2,579,066

UNITED STATES PATENT OFFICE 2,579,066

MOTOR CONTROL

Eldred P. Codling, Dayton, Ohio, assignor to General Motors Corporation, Detroit, Mich., a corporation of Delaware Application January 18, 1950, Serial No. 139,241

5 Claims. (Cl. 318—221)

This invention relates to improvements in control devices for electric motors and particularly electric motors designed and built to operate at different, selected speeds.

It is among the objects of the present invention to provide a simple and effective control device for a multi-speed electric motor which, by its simplicity, reduces costs and eliminates possible sources of field trouble usually experienced where more intricate and complicated control devices are utilized.

Further objects and advantages of the present invention will be apparent from the following description, reference being had to the accompanying drawings, wherein a preferred embodiment of the present invention is clearly shown.

In the drawing:

In the single figure, diagrammatic drawing the numeral 20 designates the rotor of the electric motor. The motor has a starting winding 21, a low speed running winding 22 and a high speed running winding 23. One end of each of said windings is connected to one power line 24. The number of poles in the stator is arbitrary, as long as the number of poles for the starting winding is equal to the number of poles for either the high speed main or the low speed main windings. Motors with 4 pole starting windings, 4 pole high speed running windings and 6 pole low speed running windings have been built and successively operated. In all instances the starting winding is displaced approximately 90 electrical degrees from its equal pole, cooperating main winding as is the case in split phase motors. The relative position of the other, different pole running winding is immaterial.

In an arrangement of this kind the energizing of the second main winding distorts the magnetic flux. It produces additional currents in the rotor conductors. On some rotor conductors the force produced by the interaction of the magnetic flux and current is greater and on some less. The total effect in producing starting torque is zero. The total line starting current is however, increased. During the acceleration of the motor the accelerating torque produced is increased.

The advantages obtained by this arrangement are: (a) No running contacts and thus, (b) lower costs, (c) reduced contact trouble and thereby service requirement reduction, (d) reduced radio interference, for each added contact increases radio interference.

The control mechanism for this two speed, electric motor comprises a manually operable selector switch having a movable contact 25 connected to the other power line 26. Two stationary terminals 27 and 28 may be engaged by the contact 25 when it is moved out of its normal, neutral position as shown. Contact 27 of the selector switch is connected to the other end of the low speed running winding 22 and contact 28 to the other end of high speed running winding 23.

The control mechanism for this two speed electric motor comprises also an automatic control switch having a movable bridging contact 30 normally, electrically engaging and bridging the two stationary terminals 31 and 32 of this control switch. The movable bridging contact 30 is electrically connected to the stationary contact 28 of the selector switch and thus also to the high speed running winding 23. Stationary terminal 31 of the control switch is electrically connected to the other stationary contact 27 of the selector switch and thus to the low speed running winding 22. Terminal 32 is connected to the starting winding 21.

The movable contact 30 of the control switch is mechanically secured to a centrifugal device 40 which is driven by the electric motor. This centrifugal device normally maintains the movable contact 30 in bridging engagement with the terminals 31 and 32 as shown, but, when the electric motor reaches a predetermined operating speed the centrifugal device actuates said movable contact out of engagement with terminals 31 and 32, thereby breaking and discontinuing the circuits passing through this control switch. When terminals 31 and 32 are not engaged by contact 30, the starting winding is rendered inoperative and one or the other running winding is likewise deenergized, dependent upon what stationary contact 27 or 28 is disengaged by contact 25. If movable contact 25 engages stationary contact 28 then the low speed running winding is out of circuit and deenergized while the high speed running winding is in circuit and the motor operates at high speed. On the contrary if contact 27 is engaged by the movable contact 25, then the low speed running winding is active and the high speed running winding out of circuit and ineffective.

When the electric motor is not operating and contact 25 of the selector switch is moved either to engage contact 27 or 28, all windings are brought into circuit and energized for motor starting purposes inasmuch as the movable contact 30 of the control switch is in bridging engagement with the terminals 31 and 32. However, as mentioned, as soon as the electric motor reaches a predetermined speed, contact 30 is moved by the centrifugal device 40 to disengage terminals 31 and 32 thus rendering the starting winding 21 and either the low speed winding 22 or the high speed winding 23 inoperative, dependent upon the position of the movable contact 25 of the selector switch.

Thus the selector switch element 25 may be moved into one position to have the motor operate at low speed and into another position to have the motor operate at high speed, all windings of the motor being initially brought into effect for starting the motor. The automatic control mechanism becomes effective, when the motor reaches proper operating speed, to render the starting winding and one or the other running winding ineffective, dependent upon the position into which the selector switch has been operated.

While the embodiment of the present invention as herein disclosed, constitutes a preferred form, it is to be understood that other forms might be adopted.

What is claimed is as follows:

1. A control device for an electric motor having a starting winding and high and low speed running windings adapted to be connected concurrently in parallel with a source of electric power, said control device consisting of two switches, one normally open but selectively movable into either one of two circuit closing positions in which it cooperates with the second, normally closed switch to connect the starting winding and both the high speed and low speed running windings in concurrent parallel circuits for starting the motor; and actuating means driven by the motor and connected to said second switch, said actuating means being operative at a predetermined motor speed to actuate said second switch into circuit breaking position thereby rendering the starting winding and either the low or the high speed running winding ineffective, dependent upon the position occupied by the selectively operable switch.

2. A control apparatus for an electric motor having a starting winding, a low speed running winding and a high speed running winding, one end of each winding being connected together and to one side of an electric power line, said control apparatus comprising a selector switch having a movable contact operative from its normal position into electrical engagement with one or another stationary contact, the movable contact being connected to the other side of the power line, each stationary contact being connected respectively with the other end of a running winding; a controller switch having a shiftable bridging contact normally engaging two stationary terminals one of which is connected to the other end of the starting winding, the other terminal being connected to the one stationary contact of the selector switch, the bridging contact being connected to the other stationary contact of the selector switch; and a centrifugal actuator driven by the motor and mechanically connected to the bridging contact normally holding said contact in engagement with its cooperating terminals to connect all windings in parallel, said actuator being operative to move the bridging contact from engagement with its two cooperating terminals when the motor attains a predetermined speed, thereby rendering the starting winding and one of the running windings ineffective.

3. A control device for an electric motor having a starting winding and high and low speed running windings adapted to be connected to a source of electric power, said control device consisting of two switches, one movable from normal open position into either one of two circuit closing positions in which it cooperates with the second switch to connect all motor windings in parallel circuits when said second switch is closed, the second switch when opened being operative to disconnect the starting winding and one or the other of the running windings and render them ineffective, dependent upon the position in which the first switch is operated.

4. A control device for an electric motor having a starting winding and high and low speed running windings adapted to be connected to a source of electric power, said control device consisting of two switches, one normally open but selectively movable into either one of two circuit closing positions in which it cooperates with the second normally closed switch to connect the starting winding and both the high speed and low speed running windings in parallel circuits for starting the motor; and means responsive to motor conditions for actuating the second switch into circuit breaking position thereby rendering the starting winding and either one of the running windings ineffective dependent upon the position of the manually operated switch.

5. A control device for an electric motor provided with a starting winding, and separate high speed and low speed running windings having one end of each connected together so as to be connectible to one side of a power line, said control device consisting of a selector switch connectible to the other power line and operative from normal space position into direct connection with the other end of either the high speed or the low speed running windings; and a motor speed controlled switch, normally closed to connect the starting winding with the selector switch in either one of its two operative positions and cooperating with the selector switch for connecting both high and low speed running windings concurrently in parallel circuits for motor starting purposes, said motor speed controlled switch disconnecting the starting winding and one running winding to render both ineffective when the motor attains a predetermined speed.

ELDRED P. CODLING.

REFERENCES CITED

The following references are of record in the file of this patent:

UNITED STATES PATENTS

| Number | Name | Date |
|---|---|---|
| 1,966,212 | Morrill | July 10, 1934 |
| 2,269,069 | Werner | Jan. 6, 1942 |